US012809739B2

(12) United States Patent
Sheshadri et al.

(10) Patent No.: US 12,809,739 B2
(45) Date of Patent: Nov. 24, 2026

(54) SYSTEMS AND METHODS FOR IDENTIFYING MISSING VALUES IN DATA OBJECTS

(71) Applicant: Optum Services (Ireland) Limited, Dublin (IE)

(72) Inventors: Siddharth G. Sheshadri, Dublin (IE); Karishma Tyagi, Sandyford (IE); Anthony Patrick Reidy, Drimnagh (IE); Breanndán O'Conchuir, Killarney (IE)

(73) Assignee: Optum Services (Ireland) Limited, Dublin (IE)

( * ) Notice: Subject to any disclaimer, the term of this patent is extended or adjusted under 35 U.S.C. 154(b) by 303 days.

(21) Appl. No.: 18/534,963

(22) Filed: Dec. 11, 2023

(65) Prior Publication Data

US 2025/0190322 A1 Jun. 12, 2025

(51) Int. Cl.
*G06F 11/34* (2006.01)
*G06F 16/2457* (2019.01)
*G06F 17/18* (2006.01)

(52) U.S. Cl.
CPC .... *G06F 11/3409* (2013.01); *G06F 16/24578* (2019.01); *G06F 17/18* (2013.01)

(58) Field of Classification Search
CPC . G06F 11/3409; G06F 16/24578; G06F 17/18
See application file for complete search history.

(56) References Cited

U.S. PATENT DOCUMENTS

| | | | | |
|---|---|---|---|---|
| 8,090,742 | B2 | 1/2012 | Mok et al. | |
| 11,468,998 | B2 | 10/2022 | Koblick et al. | |
| 11,488,714 | B2 | 11/2022 | Shankar et al. | |
| 12,423,443 | B2 * | 9/2025 | Lafon | G06F 16/3344 |
| 12,506,763 | B1 * | 12/2025 | Lin | H04L 63/1433 |
| 2017/0351837 | A1 | 12/2017 | Donovan et al. | |
| 2018/0107108 | A1 * | 4/2018 | Nakatani | G03B 35/04 |
| 2019/0072564 | A1 * | 3/2019 | Jelliffe | G16H 50/50 |
| 2019/0354907 | A1 * | 11/2019 | Granucci | G06F 9/542 |

(Continued)

OTHER PUBLICATIONS

Choi et al., "RETAIN: An Interpretable Predictive Model for Healthcare using Reverse Time Attention Mechanism," 29th Conference on Neural Information Processing Systems, 2016, retrieved from https://arxiv.org/pdf/1608.05745.pdf (13 pages).

*Primary Examiner* — Thien M Le
(74) *Attorney, Agent, or Firm* — Bookoff McAndrews, PLLC

(57) ABSTRACT

Disclosed are systems and methods for receiving one or more data objects associated with an entity, each of the one or more data objects including one or more input indicators and one or more output indicators based on the one or more input indicators and determining, using a deterministic rules graph that maps each of the one or more input indicators to a corresponding one of the one or more output indicators, at least one of a first missing value for an input indicator or a second missing value for an output indicator. A trained machine learning model is used to generate a risk score associated with each of the one or more output indicators based on the at least one of the first missing value or the second missing value. The risk score is compared to a predetermined threshold value, and an alert is generated based on the comparing.

20 Claims, 6 Drawing Sheets

(56) References Cited

U.S. PATENT DOCUMENTS

| | | | | |
|---|---|---|---|---|
| 2023/0230169 | A1* | 7/2023 | Parient | G06Q 10/0635 705/4 |
| 2023/0315202 | A1* | 10/2023 | Poulos | G06F 3/013 345/156 |
| 2024/0047070 | A1* | 2/2024 | Megerian | G06N 5/02 |
| 2024/0176889 | A1* | 5/2024 | Alam | G06F 21/577 |
| 2024/0290499 | A1* | 8/2024 | Hsu | G16H 50/30 |
| 2025/0068741 | A1* | 2/2025 | Lafon | G06F 16/3344 |

* cited by examiner

SYSTEMS AND METHODS FOR IDENTIFYING MISSING VALUES IN DATA OBJECTS

TECHNICAL FIELD

The present disclosure generally relates to the field of data analytics. In particular, the present disclosure relates to systems and methods for identifying missing values in data objects, the data objects including input indicators and output indicators based on the input indicators.

BACKGROUND

Missing values in data objects are often difficult to identify efficiently and, even when identified, the criticality of resolving the missing values may not be readily apparent.

Data objects may include a variety of different types of records stored in a variety of places under a variety of different conditions. For instance, some data objects may have been electronically created and stored in an electronic database. Accessing all of these data objects and identifying any missing values associated with these data objects is a difficult task.

Furthermore, simply identifying missing values may not be helpful in determining next steps to optimally process or complete data records. Some missing values may be more critical than others, and this may not be readily apparent without a holistic analysis of the data objects and the importance of the particular missing values.

Therefore, there exists a need for a more sophisticated and accurate approach to identifying missing values in data objects.

This disclosure is directed to addressing the above-mentioned challenges. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

The present disclosure solves the problems described above or elsewhere in the present disclosure and improves the state of conventional document processing. The present disclosure teaches systems and methods for identifying missing values in data objects.

In some aspects, the techniques described herein relate to a computer-implemented method comprising: receiving, by one or more processors, one or more data objects associated with an entity, each of the one or more data objects including one or more input indicators and one or more output indicators based on the one or more input indicators; determining, by the one or more processors and using a deterministic rules graph that maps each of the one or more input indicators to a corresponding one of the one or more output indicators, at least one of a first missing value for an input indicator of the one or more input indicators or a second missing value for an output indicator of the one or more output indicators; generating, by the one or more processors and using a trained machine learning model, a risk score associated with each of the one or more output indicators based on the at least one of the first missing value or the second missing value; comparing, by the one or more processors, the risk score associated with each of the one or more output indicators to a predetermined threshold value; and causing, by the one or more processors, the at least one of the first missing value or the second missing value to be displayed on a user device as an alert generated based on the comparing.

In some aspects, the techniques described herein relate to a system comprising memory and one or more processors communicatively coupled to the memory, the one or more processors configured to: receive one or more data objects associated with an entity, each of the one or more data objects including one or more input indicators and one or more output indicators based on the one or more input indicators; determine, using a deterministic rules graph that maps each of the one or more input indicators to a corresponding one of the one or more output indicators, at least one of a first missing value for an input indicator of the one or more input indicators or a second missing value for an output indicator of the one or more output indicators; generate, using a trained machine learning model, a risk score associated with each of the one or more output indicators based on the at least one of the first missing value or the second missing value; compare the risk score associated with each of the one or more output indicators to a predetermined threshold value; and cause the at least one of the first missing value or the second missing value to be displayed on a user device as an alert generated based on the comparing.

In some aspects, the techniques described herein relate to one or more non-transitory computer-readable storage media including instructions that, when executed by one or more processors, cause the one or more processors to: receive one or more data objects associated with an entity, each of the one or more data objects including one or more input indicators and one or more output indicators based on the one or more input indicators; determine, using a deterministic rules graph that maps each of the one or more input indicators to a corresponding one of the one or more output indicators, at least one of a first missing value for an input indicator of the one or more input indicators or a second missing value for an output indicator of the one or more output indicators; generate, using a trained machine learning model, a risk score associated with each of the one or more output indicators based on the at least one of the first missing value or the second missing value; compare the risk score associated with each of the one or more output indicators to a predetermined threshold value; and cause the at least one of the first missing value or the second missing value to be displayed on a user device as an alert generated based on the comparing.

BRIEF DESCRIPTION OF THE DRAWINGS

The accompanying drawings, which are incorporated in and constitute a part of this specification, illustrate various example embodiments and together with the description, serve to explain the principles of the disclosed embodiments.

DETAILED DESCRIPTION

Figure 1:
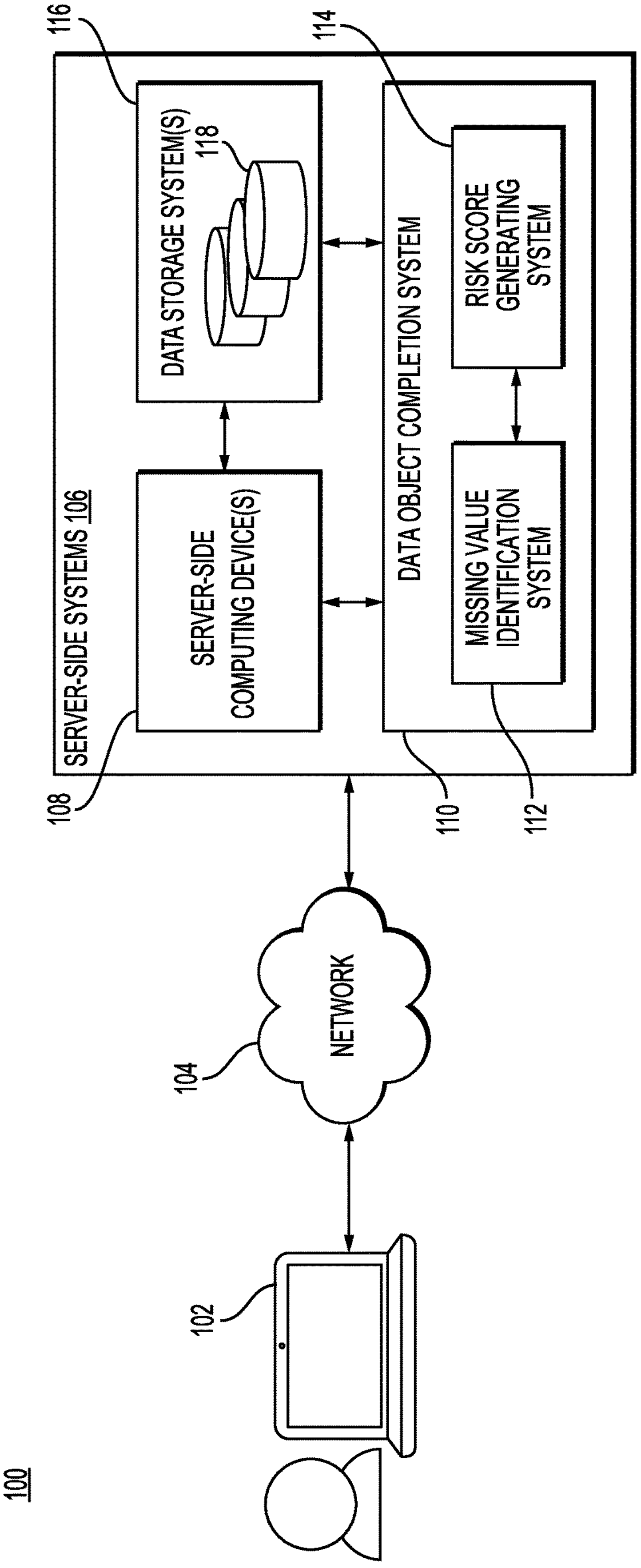
FIG. 1 is a diagram showing an example of an environment for identifying missing values in data objects, according to some embodiments of the disclosure.

Various embodiments of this disclosure relate generally to techniques for data analytics, and, more particularly in some embodiments, to systems and methods for identifying missing values in data objects and using a machine learning model to rank and prioritize the missing values for completion.

As discussed above, accessing data objects of various types that are stored in a variety of places and under a variety of conditions to identify missing values in the data objects is a difficult task. Additionally, it is often unclear if any missing values in the data objects are more critical than others.

Techniques disclosed herein may address these technical issues, providing technical improvements over conventional technology. For example, use of a deterministic rules engine, described in more detail below, identifies all missing values in a list of data objects associated with an entity, and identifies the missing values that are common to multiple output indicators. Additionally, a trained machine learning model determines a risk score associated with each missing value, such that the missing values can be ranked based on a risk score, or risk scores can be summed for one entity and compared to summed risk scores for other entities, such that the entities can be ranked based on risk score. These techniques allow for prioritization of completion of data objects. The above technical improvements, and additional technical improvements, will be described in detail throughout the present disclosure. Also, it should be apparent to a person of ordinary skill in the art that the technical improvements of the embodiments provided by the present disclosure are not limited to those explicitly discussed herein, and that additional technical improvements exist.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the embodiments are not to be considered as limited by the foregoing description.

Various non-limiting embodiments of the present disclosure will now be described to provide an overall understanding of the principles of the structure, function, and use of systems and methods disclosed herein for missing values in data objects.

Reference to any particular activity is provided in this disclosure only for convenience and not intended to limit the disclosure. A person of ordinary skill in the art would recognize that the concepts underlying the disclosed devices and methods may be utilized in any suitable activity. For example, while the present disclosure is in the context of healthcare management, one of ordinary skill would understand the applicability of the described systems and methods to similar tasks in a variety of contexts or environments. The disclosure may be understood with reference to the following description and the appended drawings, wherein like elements are referred to with the same reference numerals.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

In this disclosure, the term "based on" means "based at least in part on." The singular forms "a," "an," and "the" include plural referents unless the context dictates otherwise. The term "exemplary" is used in the sense of "example" rather than "ideal." The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. The term "or" is used disjunctively, such that "at least one of A or B" includes, (A), (B), (A and A), (A and B), etc. Relative terms, such as, "substantially" and "generally," are used to indicate a possible variation of ±10% of a stated or understood value.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

As used herein, a "machine-learning model" generally encompasses instructions, data, and/or a model configured to receive input, and apply one or more of a weight, bias, classification, or analysis on the input to generate an output. The output may include, for example, a classification of the input, an analysis based on the input, a design, process, prediction, or recommendation associated with the input, or any other suitable type of output. A machine-learning model is generally trained using training data, e.g., experiential data and/or samples of input data, which are fed into the model in order to establish, tune, or modify one or more aspects of the model, e.g., the weights, biases, criteria for forming classifications or clusters, or the like. Aspects of a machine-learning model may operate on an input linearly, in parallel, via a network (e.g., a neural network), or via any suitable configuration.

Training the machine-learning model may include one or more machine-learning techniques, such as linear regression, logistical regression, random forest, gradient boosted machine (GBM), deep learning, and/or a deep neural network. Supervised and/or unsupervised training may be employed. For example, supervised learning may include providing training data and labels corresponding to the training data, e.g., as ground truth. Unsupervised approaches may include clustering, classification or the like. K-means clustering or K-Nearest Neighbors may also be used, which may be supervised or unsupervised. Combinations of K-Nearest Neighbors and an unsupervised cluster technique may also be used. Any suitable type of training may be used, e.g., stochastic, gradient boosted, random seeded, recursive, epoch or batch-based, etc. After training the machine-learning mode, the machine-learning model may be deployed in a computer application for use on new input data that the machine-learning model has not been trained on previously.

FIG. 1 is a diagram showing an example of an environment 100 for processing data objects, according to some embodiments of the disclosure. A client device 102 associated with a user communicates with one or more other components of the environment 100 across a network 104, including one or more server-side systems 106. The server-side systems 106 include a server-side computing device(s) 108, a data object completion system 110, and/or one or more data storage system(s) 116, among other systems. In some examples, the data object completion system 110 includes a missing value identification system 112 and a risk score generating system 114. The data storage system(s) 116 include one or more data stores 118.

In some examples, the server-side computing device(s) 108, the data object completion system 110, and/or the data storage system(s) 116 are associated with a common entity and are part of a cloud service computer system (e.g., in a data center). That is, the various systems can be components or subsystems of a larger computer system. In other examples, one or more of the server-side computing device(s) 108, the data object completion system 110, and/or the data storage system(s) 116 are separate systems associated with different entities. In such examples, each of the separate systems are communicatively connected to one another over the network 104 (e.g., via an application programming interface (API)). The systems and devices of the environment 100 can communicate in any arrangement. As will be discussed herein, systems and/or devices of the environment 100 communicate in order to facilitate processing of data objects, particularly data object completion.

The client device 102 is configured to enable the user to access and/or interact with other systems in the environment 100. In some examples, the user is associated with (e.g., is an employee or contractor of) the entity. The client device 102 is a computer system such as, for example, a desktop computer, a laptop computer, a tablet, a smart cellular phone, a smart watch, or other wearable computer, etc. The client device 102 includes one or more applications, e.g., a program, plugin, browser extension, etc., installed on a memory of the client device 102. The applications can include one or more of system control software, system monitoring software, software development tools, etc.

In some embodiments, at least one of the applications is associated and configured to communicate with one or more of the other components in the environment 100, such as one or more of the server-side systems 106. For example, the at least one application can be executed on the client device 102 to communicate with the server-side computing device(s) 108 to request generation of data objects or a list of data objects. The data objects are identified within the list based on metadata (e.g., a file name, a file property, a storage location) of the documents or other similar identifying information. The application can then process the data objects to determine if the data objects include any missing values, and give the user a list of missing values ordered by some priority useful to the user.

Additionally, one or more components of the client device 102, such as the at least one application, generate, or cause to be generated, one or more graphic user interfaces (GUIs) based on instructions/information stored in the memory, instructions/information received from the other systems in the environment 100, and/or the like and cause the GUIs to be displayed via a display of the client device 102. The GUIs can be, e.g., mobile application interfaces or browser user interfaces and include text, input text boxes, selection controls, and/or the like. In some examples, the display includes a touch screen or a display with other input systems (e.g., a mouse, keyboard, etc.) to control the functions of the client device 102.

The server-side computing device(s) 108 include one or more server devices (or other similar computing devices) for executing services associated with an entity. The services can include both user-facing services as well as internal services.

In some examples, the data object completion system 110 is a system of (e.g., is hosted by) the same entity associated with the server-side computing device(s) 108. In such examples, the data object completion system 110 can be a sub-system or component of the server-side computing device(s) 108. In other examples, the data object completion system 110 is a system of (e.g., is hosted by) a third party that provides data object competition serves to the entity associated with the server-side computing device(s) 108.

The missing value identification system 112 of the data object completion system 110 includes one or more server devices (or other similar computing devices) for executing reduction processes. As described in detail elsewhere herein, example missing value identification processes include: generating or receiving a deterministic rules graph that include data clusters that map each of one or more input indicators to a corresponding one of one or more output indicators in a data object, determining at least one of a first missing value for an input indicator of the one or more input indicators or a second missing value for an output indicator of the one or more output indicators. In some examples, this process includes the steps of receiving a plurality of data objects including input indicators and output indicators, receiving a plurality of discrete deterministic rules graphs, each discrete deterministic rules graph including a data cluster including an output indicator and its associated input indicators, and amalgamating the plurality of discrete deterministic rules graphs into a single specific deterministic rules graph that includes all of the data clusters.

The risk score generating system 114 includes one or more server devices (or other similar computing devices) for executing risk score determinations and ordering processes. As described elsewhere herein, example processes performed by the risk score generating system 114 include: receiving a list of missing values in one or more data objects, receiving a trained machine learning model, using the trained machine learning model to generate a risk score associated with each of the one or more output indicators based on the missing values, and generating a list of input indicators with missing values associated with output indicators with missing values, the input indicators within the list being ordered based on the risk scores associated with the corresponding output indicators.

The data storage system(s) 116 each include a server system or computer-readable memory such as a hard drive, flash drive, disk, etc. The data stores 118 of the data storage system(s) 116 include and/or act as a repository or source for various types of data objects.

In some examples, one of the data storage system(s) 116 maintains each of the data stores 118. In other examples, one or more of the data stores 118 are maintained across two or more different ones of the data storage system(s) 116. One or more of the data storage system(s) 116 can be a system of (e.g., hosted by) the same entity associated with the server-side computing device(s) 108 and/or data object completion system 110. Additionally or alternatively, one or more of the data storage system(s) 116 are associated with a third party that provides data storage services to the entity and/or data object completion system 110.

Further, at least one of the data stores 118 stores one or more trained models that are retrieved and executed by the data object completion system 110 to facilitate data object completion. For example, the trained models include a trained machine learning model used to generate a risk score associated with a missing value in the data objects. Advantageously, the trained machine learning model is implemented by the risk score generating system 114 to enable an ordering of the medical documents determined to include at least one undocumented condition within at least a subset of the data objects based on the determined risk scores.

The network 104 over which the one or more components of the environment 100 communicate includes one or more wired and/or wireless networks, such as a wide area network ("WAN"), a local area network ("LAN"), personal area network ("PAN"), a cellular network (e.g., a 3G network, a 4G network, a 5G network, etc.) or the like. In some embodiments, the network 104 includes the Internet, and information and data provided between various systems occurs online. "Online" means connecting to or accessing source data or information from a location remote from other devices or networks coupled to the Internet. Alternatively, "online" refers to connecting or accessing a network (wired or wireless) via a mobile communications network or device. The Internet is a worldwide system of computer networks-a network of networks in which a party at one computer or other device connected to the network can obtain information from any other computer and communicate with parties of other computers or devices. The client device 102 and one or more of the server-side systems 106 are connected via the network 104, using one or more standard communication protocols. The client device 102 and the one or more of the server-side systems 106 transmit and receive communications from each other across the network 104.

Although depicted as separate components in FIG. 1, it should be understood that a component or portion of a component in the system of the environment 100 is, in some embodiments, integrated with or incorporated into one or more other components. As one example, the missing value identification system 112 and risk score generating system 114 can be integrated into a single component or sub-system of the data object completion system 110. In some embodiments, operations or aspects of one or more of the components discussed above are distributed amongst one or more other components. Any suitable arrangement and/or integration of the various systems and devices of the environment 100 can be used.

In the following disclosure, various acts are described as performed or executed by a component from FIG. 1, such as the client device 102 or one or more of the server-side systems 106, or components thereof. However, it should be understood that in various aspects, various components of the environment 100 discussed above execute instructions or perform acts including the acts discussed below. An act performed by a device is considered to be performed by one or more processors, actuators, or the like associated with that device. Further, it should be understood that in various embodiments, various steps can be added, omitted, and/or rearranged in any suitable manner.

Figure 2:
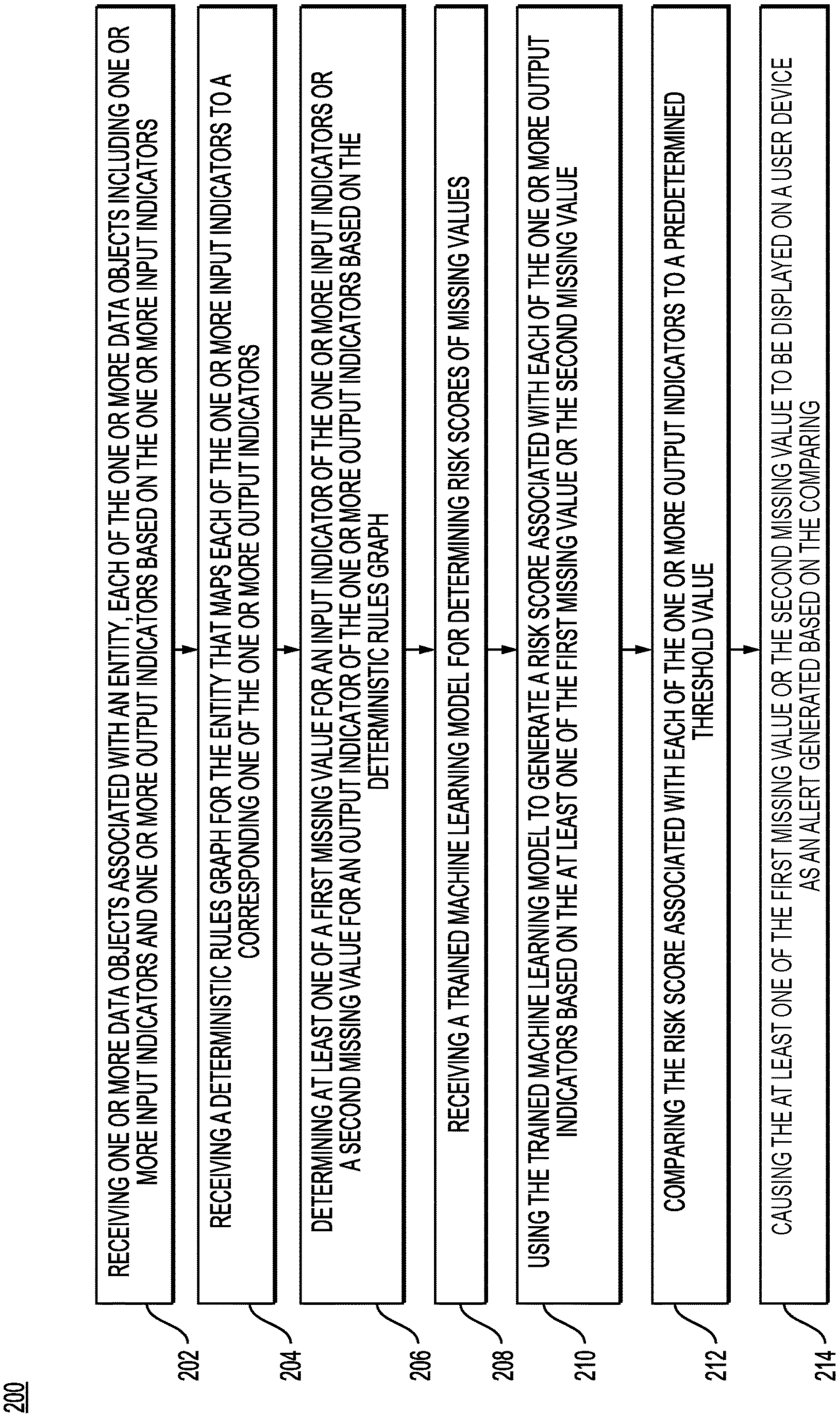
FIG. 2 is a flow chart showing an example of a process for identifying and ranking missing values in data objects, according to some embodiments of the disclosure.

FIG. 2 is a flow chart showing an example of a process 200 for data object completion, according to some embodiments of the disclosure. In some examples, the process 200 is performed by the missing value identification system 112 and/or risk score generating system 114 of the data object completion system 110. The process 200 can be performed in response to receiving a request to review data objects for missing values (e.g., from the client device 102).

At step 202, the process 200 includes receiving one or more data objects associated with an entity, each of the one or more data objects including one or more input indicators and one or more output indicators based on the one or more input indicators. In some examples, this includes receiving a list 302 of a plurality of data objects. Each data object is associated with a respective entity. In some examples, each data object is associated with a patient enrolled in a medical plan (e.g., provided by a payer or health plan provider) for which a medical document review process is performed. To provide an illustrative example where the data object completion process is being performed to optimize closure of documentation gaps in a healthcare cohort to maximize the cohort diagnosis rate, the list includes every available medical document that is associated with one of the patients in the healthcare cohort. Resultantly, the list can include hundreds of thousands to millions of medical documents.

The medical documents listed can include medical charts, clinical notes, admission and/or discharge summaries, and/or other similar records or documentation from healthcare providers that can potentially include a condition (e.g., an International Classification of Diseases (ICD) code) included therein. The ICD codes are determined based on the presence of requisite clinical codes. As such, the clinical codes act as input indicators that determine the ICD codes, which are the output indicators in the current disclosure.

At step 204, the data object completion system 110 receives or generates a deterministic rules graph for the entity that maps each of the one or more input indicators to a corresponding one of the one or more output indicators, as will be described in more detail in FIG. 5A. The deterministic rules graph may be pre-generated and stored in data store(s) 118. In the example where the data object completion process is being performed to optimize closure of documentation gaps in a healthcare cohort, the deterministic rules graph maps clinical codes to corresponding ICD codes. A patient, also called a user or an entity, is diagnosed with a disease, as represented by an ICD code, if the user has a particular value for each of the clinical codes associated with the ICD code that is indicative of that disease. In one example, the ICD code for disease XYZ may be based on the presence of clinical codes for albuterol, sulphate, R05.1, and a positive X-ray. The particular value for each clinical code and for the ICD code is represented as a binary, e.g., 0 or 1, Yes or No, True or False. For example, the value for albuterol is either "1" for "albuterol has been prescribed to the patient" or "0" for "albuterol has not been prescribed to the patient."

At step 206, the method includes determining at least one of a first missing value for an input indicator of the one or more input indicators or a second missing value for an output indicator of the one or more output indicators based on the deterministic rules graph. Continuing with the example where the data object completion process is being performed to optimize closure of documentation gaps in a healthcare cohort, a first missing value is associated with any clinical code, or input indicator, that has no data. For example, while 1 represents "1" for "albuterol has been prescribed to the patient" and "0" for "albuterol has not been prescribed to the patient," a missing value represents the prescription status being unknown. A second missing value is associated with any ICD code, or output indicator, that has all clinical codes that the ICD code is based on satisfied, but has no data itself. This situation arises where a patient's medical records include positive input indicators for all the clinical codes associated with the ICD code, but there has been a failure to make or catalog a diagnosis of the disease associated with the ICD code in the patient's records.

In a first example, patient A's medical records include the clinical codes for albuterol, sulphate, and R05.1, and a positive X-ray. Patient A's medical records also include an ICD code indicating a diagnosis for disease XYZ. The missing value identification system 112 does not identify any missing values associated with patient A with regard to the deterministic rules graph for the output indicator ICD code XYZ.

In a second example, patient B's medical records include the clinical codes for albuterol, sulphate, and R05.1, but have no data regarding an X-ray for patient B. The missing value identification system 112 identifies a missing value associated with patient B for the input indicator clinical code "X-ray" with regard to the deterministic rules graph for the output indicator ICD code XYZ. This missing value may be communicated to a practitioner, such that the practitioner may be alerted that an X-ray for patient B is necessary to complete the data object. As will be discussed further below, a trained machine learning model is further used to determine the likelihood that the X-ray for patient B would yield a positive result. Advantageously, this risk score can be used to determine a priority for conducting the X-ray to fill in the missing value.

In a third example, patient C's medical records include the clinical codes for albuterol, sulphate, and R05.1, and a positive X-ray. Based on the deterministic rules graph for ICD code XYZ, patient C should be diagnosed with the condition associated with ICD code XYZ. However, the value for the output indicator ICD code XYZ is not present. The missing value identification system 112 identifies a missing value with regard to the deterministic rules graph for the output indicator ICD code XYZ. Where all the input indicators in a deterministic rules graph are present and there is no corresponding data for the associated output indicator, the missing value identification system 112 identifies a second missing value.

In a fourth example, patient D's medical records include the clinical codes for albuterol, sulphate, and R05.1, and a negative X-ray. Based on the deterministic rules graph for ICD code XYZ, patient D should not be diagnosed with the condition based on the negative X-ray. The value for the output indicator ICD code XYZ may be 0 or may not be present. In either case, the missing value identification system 112 does not identify a missing value with regard to the deterministic rules graph for the output indicator ICD code XYZ. The missing value identification system 112 only identifies missing values for output indicators where all of the input indicators in the deterministic rules graph are present and indicate the output indicator, yet the output indicator data is missing. In some examples, the method may be completed at step 206, with a list of missing values generated and output by the missing value identification system. Advantageously, the method may continue to the remaining steps described below to generate a priority order for completing the data objects based on risk scores generated by the risk score generating system.

At step 208, a trained machine learning is received or retrieved for determining risk scores of the missing values identified in step 206. In some examples, the trained machine learning model is stored in data storage system(s) 116 for retrieval by data object completion system 110. At step 210, data object completion system 110 applies the trained machine learning model to generate a risk score associated with each of the one or more output indicators based on the at least one of a first missing value, e.g., a missing value for an input indicator, or a second missing value, e.g., a missing value for an output indicator.

The risk scores output by the model are to be interpreted as a likelihood that the data object is missing an output indicator, as described in step 210. In the examples where the data object completion process is being performed to optimize closure of documentation gaps in a healthcare cohort, the risk score output by the model represent the likelihood that a patient or user is missing an ICD code that corresponds to a diagnosis for a disease.

Continuing with the examples above, in the first example, patient A did not have any missing values identified for ICD code XYZ. As such, patient A's risk score for ICD code XYZ is determined to be zero. This corresponds to the data object completion system indicating that there is no risk, based on the data available in the data objects provided to the data object completion system, that patient A may be undiagnosed for the condition represented by ICD code XYZ.

In the second example, it was determined that the medical records for patient B had a missing value for the input indicator, or clinical code, for an X-ray. The machine learning model is trained to determine the likelihood that the missing value for this indicator for patient B is a positive X-ray, and thus that patient B has the condition associated with output indicator ICD code XYZ but remains undiagnosed. In some examples, the risk score is a value between 0 and 1, a risk score of 0 indicating zero probability that the missing value for ICD code XYZ is 1, and a risk score of 1 indicating that the probability that the missing value for ICD code XYZ for patient B is 100%, or certain.

It is to be noted that the risk score is associated with the output indicator. In some examples, the risk score is a representation of the likelihood that the missing value for the output indicator is one, where the value for the output indicator is either zero or one. In some examples, the risk score generating system 114 calculates or determines a likelihood that the value for each missing value for each input indicator is 1. In an example where a patient has two missing values for two input indicators associated with an output indicator, the risk score for the output indicator is the value of the risk scores for the two missing input indicators multiplied together. For example, if the risk score generating system 114 determines a risk score for a first input indicator is 0.8, and a risk score for a second input indicator is 0.5, the risk score for the output indicator associated with these input indicators is 0.8*0.5, or 0.4.

In an example where there is only one missing input indicator associated with an output indicator, the risk score for the output indicator is equal to the risk score of the input indicator. In an example where there are no missing input indicators, but there is no data for the output indicator, e.g., the missing value is the output indicator, the risk score generating system 114 outputs a risk score for the output indicator of 1. This is analogous to the example of patient C above. In some examples, the method is completed after step 208, and the risk score generating system outputs an ordered list 332 of output indicators based on their risk scores, as described in more detail in FIG. 3.

At step 212, the data object completion system compares the risk score associated with each of the one or more output indicators to a predetermined threshold value. In the examples where the data object completion process is being performed to optimize closure of documentation gaps in a healthcare cohort, a predetermined threshold can be applied to yield a prediction of one of the two classes: presence or absence of the undocumented condition. For example, if the predetermined threshold is 0.5, a probability less than 0.5 yields a predicted absence of the undocumented condition and a probability equal to or greater than 0.5 yields a predicted presence of the undocumented condition. A threshold can be set to a value other than 0.5, with lower values representing more sensitive thresholds and higher values representing more selective thresholds.

At step 214, the data object completion system causes the at least one of the first missing value or the second missing value to be displayed on a user device, such as client device 102, as an alert based on the comparing. The alert may be a notification, an audible alert, a visual alert, or other similar message for transmission to the client device 102 over the network 104.

Figure 3:
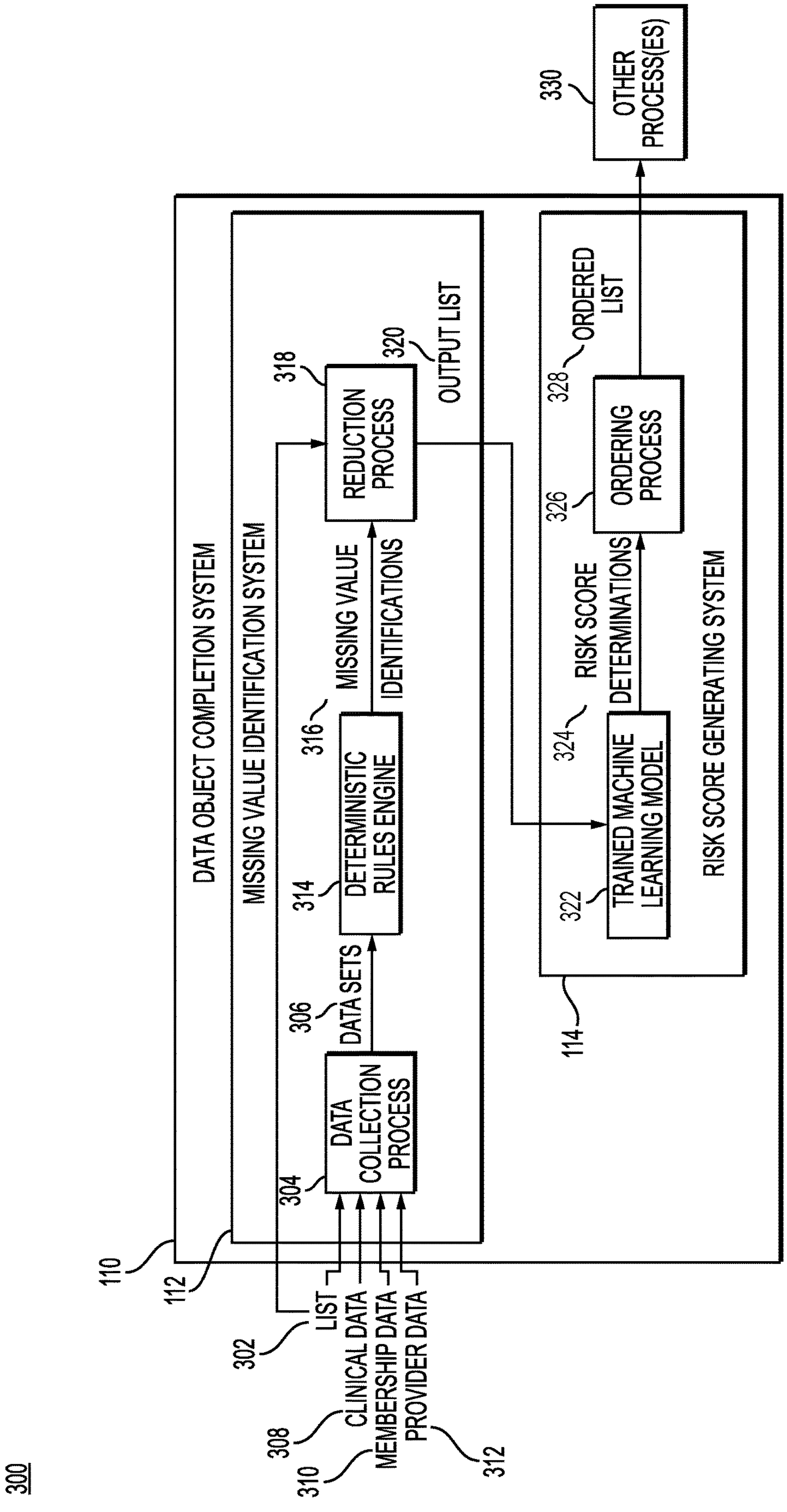
FIG. 3 is a system flow diagram conceptually showing the process of FIG. 2 performed by components of the environment of FIG. 1, according to some embodiments of the disclosure.

FIG. 3 is a system flow diagram 300 conceptually showing the process 200 of FIG. 2 performed by one or more components of the environment of FIG. 1, according to some embodiments of the disclosure.

In the illustrative example where the data object completion process is being performed to optimize closure of documentation gaps in a healthcare cohort to maximize the cohort diagnosis rate, a list 302 of data objects includes every available medical document that is associated with one of the patients in the healthcare cohort. Resultantly, the list can include hundreds of thousands to millions of medical documents. The medical documents are identified within the list based on document metadata (e.g., a file name, a file property, or a storage location) or other similar identifying information.

Each data object includes a dataset. In some example wherein the data objects are medical documents, the dataset 306 for some medical document includes clinical data 308, membership data 310, and/or provider data 312 associated with the respective user. In some examples, the missing value identification system 112 receives the list 302, along with the clinical data 308, membership data 310, and/or provider data 312 associated with each of the users from one or more of the data stores 118, and generates the dataset 306 for each medical document as part of a data collection process 304. In other examples, the dataset 306 for each medical document is generated by another system or device and is received by the missing value identification system 112.

Example types of the clinical data 308 associated with a respective user include suspect data, laboratory data, pharmaceutical data, and/or metadata of one or more medical documents of the respective user. The clinical data is received or collected from one or more external resources, such as healthcare provider systems, laboratory systems, pharmaceutical systems, or other similar systems. The clinical data is stored in association with an identifier of the user (e.g., a plan account number or other similar identifier).

The membership data includes health plan information associated with each of the plurality of users. Example health plan information includes claims data, monthly membership record (MMR) data, and model output report (MOR) data. The health plan information is received or collected from the server-side computing device(s) 108 and/or from external resources. Similar to the clinical data, the health plan information is stored in association with the identifier of the user.

The provider data includes information associated with healthcare providers of the plurality of users. Example healthcare provider information includes demographic data and/or behavioral data of the healthcare providers. The healthcare provider information is received or collected from the server-side computing device(s) 108 and/or from external sources, such as the healthcare providers or third party services that collect and/or analyze demographic data and/or behavioral data of the healthcare providers. Similar to the clinical data, the healthcare provider information is stored in association with the identifier of the user. Additionally, the healthcare provider information can be stored in association with a particular medical document. For example, the healthcare provider information stored in association with the identifier of the user can be tagged with metadata of the document (e.g., a file name, a file property, a storage location, or other similar identifying information).

The datasets 306 for the medical documents, including clinical data 308, membership data 310, and/or provider data 312 associated with respective users, is delivered or transmitted to a deterministic rules engine 314 that identifies missing values in the datasets 306, as described in FIG. 2. In some examples, the missing value identifications 316 are used in a reduction process 318 to remove data clusters 506 with no missing values from the output list 320 to the risk score generating system. Data clusters 506 comprise an output indicator and one or more input indicators that the output indicator is based on, and are described in more detail with respect to FIGS. 5A and 5B.

The output list 320 is provided to the risk score generating system 114, which includes the trained machine learning model 322 for determining risk scores, as described with reference to FIG. 2 above. The trained machine learning model 322 outputs the risk score determinations 324 for each of the output indicators in the output list 320. In some examples, the risk score determinations 324 are provided to an ordering process 326, where the output list 320 is updated to an ordered list 328 based on the risk scores associated with each of the output indicators. The ordered list 328 may then be used in other process(es) as indicated at 330. The other processes may include, for example, prioritizing completion measures based on the priority of completing the missing values based on the risk scores, as described below.

In some examples, the ordered list 328 is a list of all of the output indicators associated with a single entity from highest risk score to lowest risk score. In the example where the data object completion process is being performed to optimize closure of documentation gaps in a healthcare cohort to maximize the cohort diagnosis rate, this allows a practitioner to identify the likelihood that additional documentation will lead to the detection and recorded diagnosis of health conditions. A higher risk score for an output code indicates a higher likelihood that a member of the cohort will be diagnosed with the disease or condition associated with the output code if the missing values are completed. Thus, a practitioner may prioritize the treatment and testing of a patient based on the patient's ordered list 328 of risk scores output by the data object completion system 110.

Advantageously, in yet other examples, one other process 330 is a risk score amalgamation process. In such an example, the ordered list 328 is processed to output amalgamated risk scores for a plurality of entities from highest amalgamated risk score to lowest amalgamated risk score. In the example where the data object completion process is being performed to optimize closure of documentation gaps in a healthcare cohort to maximize the cohort diagnosis rate, this ranks patients in a cohort from highest total risk score for a plurality of missing diagnoses to lowest. Amalgamating risk scores is described in more detail with respect to FIGS. 4-5B.

Figure 4:
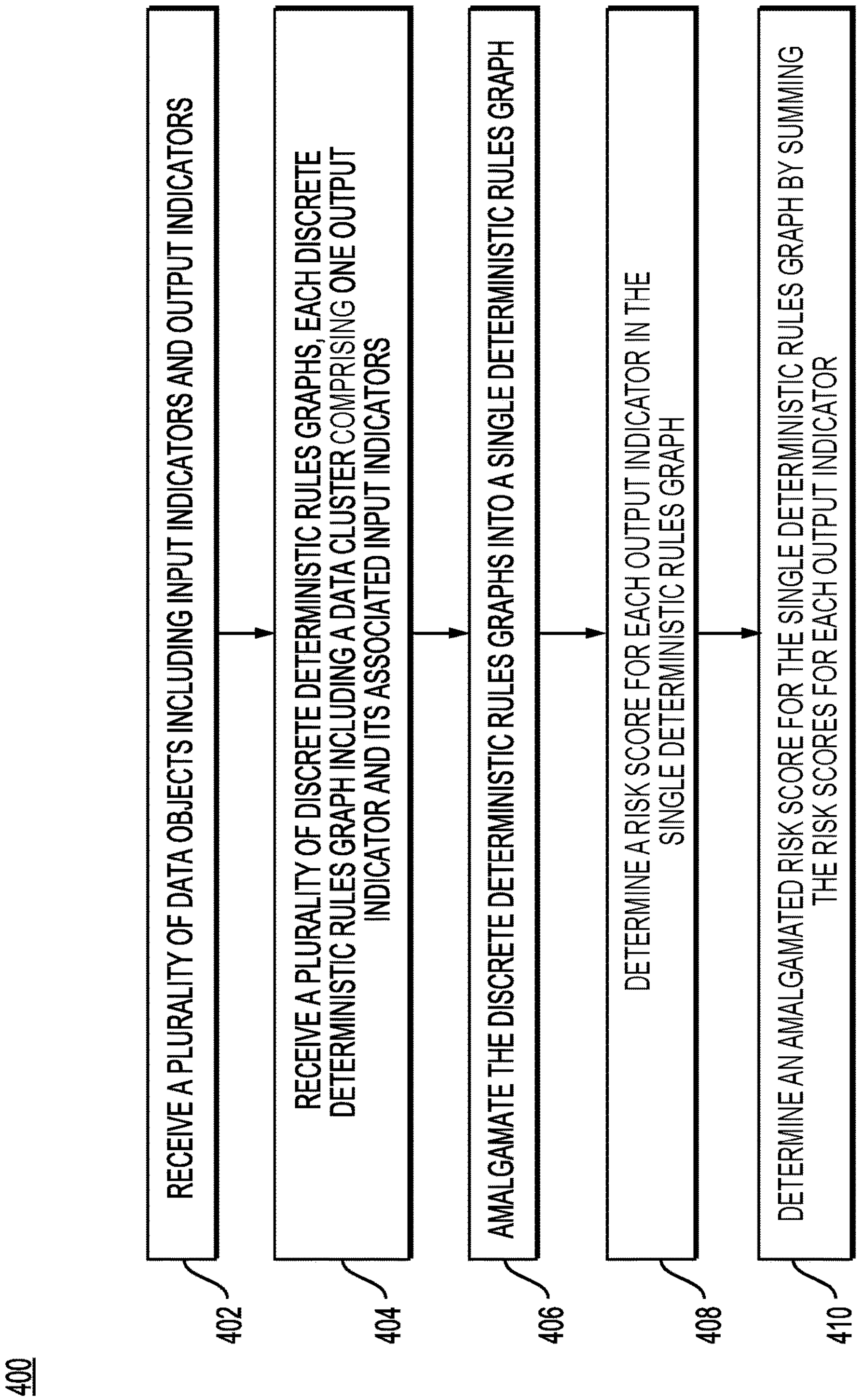
FIG. 4 is flow chart showing an example of a process for identifying missing values in data objects, according to some embodiments of the disclosure.
Figure 5A:
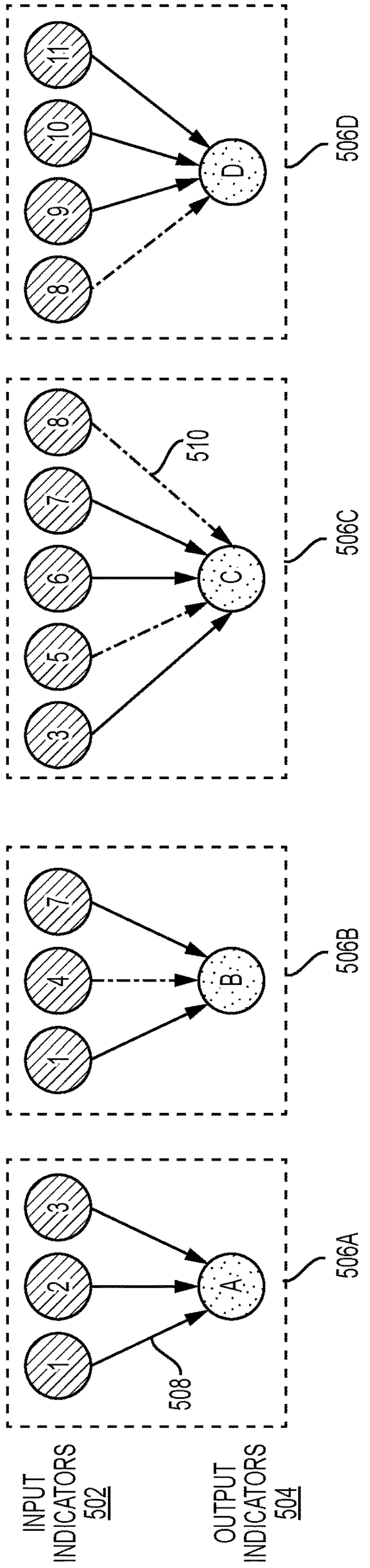
FIGS. 5A-5B depict example diagrams for amalgamating discrete deterministic rules graphs into an entity-specific deterministic rules graph, according to some embodiments of the disclosure.
Figure 5B:
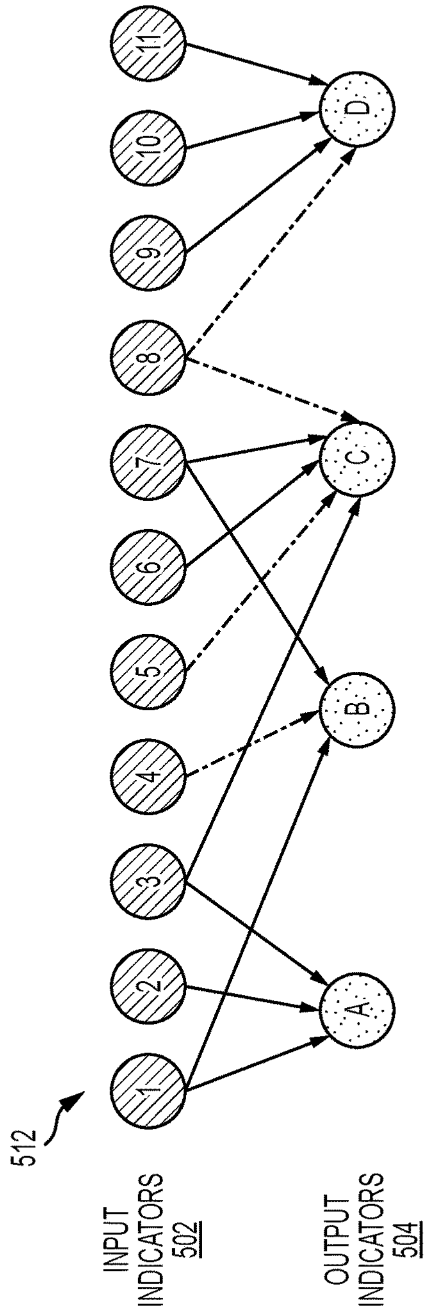

FIG. 4 is flow chart showing an example of a process for identifying missing values in data objects, and FIGS. 5A-5B depict diagrams for amalgamating discrete deterministic rules graphs into an entity-specific deterministic rules graph. Referring concurrently to FIGS. 4-5B, in some examples, the process 400 is performed by the missing value identification system 112.

At step 402, the missing value identification system 112 receives a plurality of data objects including one or more input indicators and one or more output indicators. Similar to step 202 described above with reference to FIG. 2, each of the one or more input indicators and one or more output indicators based on the one or more input indicators is received. In some examples, this includes receiving a list 302 of a plurality of data objects. Each data object is associated with a respective entity. In some examples, each data object is associated with a patient enrolled in a medical plan (e.g., provided by a payer or health plan provider) for which a medical document review process is performed. In the illustrative example where the data object completion process is being performed to optimize closure of documentation gaps in a healthcare cohort to maximize the cohort diagnosis rate, the list includes every available medical document that is associated with one of the patients in the healthcare cohort.

At step 404, the deterministic rules engine 314 provides a plurality of discrete deterministic rules graphs, each discrete deterministic rules graph including a data cluster (e.g., data clusters 506A-D in FIG. 5A) comprising one output indicator and its associated input indicators 502. The discrete deterministic rules graphs are rule-based correlations between one or more input indicators and one or more output indicators, and are stored in and retrieved from the data storage system(s) 116 or stored in a memory within deterministic rules engine 314.

FIG. 5A depicts four data clusters for four discrete deterministic rules graphs for an entity. Data cluster 506A indicates that output code A is associated with input indicators 1, 2, and 3. Data cluster 506B indicates that output code B is associated with input indicators 1, 4, and 7. Additionally, data cluster 506C indicates that output code C is associated with input indicators 3, 5, 6, 7, and 8, and data cluster 506D indicates that output D is associated with input indicators 8, 9, 10, and 11.

In the illustrative example where the data object completion process is being performed to optimize closure of documentation gaps in a healthcare cohort to maximize the cohort diagnosis rate, each data cluster 506A-D represents an ICD code (output indicator 504) and its associated clinical codes (input indicators 502). Note that each data cluster 506A-D includes exactly one output indicator 504, but there is no standard or limit to the number of input indicators 502 included in each data cluster. Note further that the same input indicator 502 may be present in two different data clusters, such as input indicator 1 being present in data cluster 506A and in data cluster 506B.

Arrows 508 represent a mapping between input indicators 502 and output indicators 504, with solid arrows indicating identified values for input indicators 502 and broken arrows 510 indicating missing values for input indicators 502. In the example shown in FIG. 5A, missing values are identified for input indicators 4, 5, and 8. Input indicator 8 is included in two data clusters, data cluster 506C and data cluster 506D.

At step 406, the discrete deterministic rules graphs shown in FIG. 5A are amalgamated, or combined, into a single deterministic rules graph as shown in FIG. 5B. In the illustrative example where the data object completion process is being performed to optimize closure of documentation gaps in a healthcare cohort to maximize the cohort diagnosis rate, the single determining rules graph is a member- or patient-specific deterministic rules graph, and a member-specific deterministic rules graph is produced for each patient in the cohort.

The single deterministic rules graph for a given member of the cohort includes all of the input indicators 502 and all of the output indicators 504 in the data objects associated with the member. As seen in FIG. 5B, the single member-specific deterministic rules graph further indicates all of the known values, such as input indicators 1-3, 6, 7, and 9-11, and all the missing values. The missing values for the input indicators are shown by broken arrows 510 and include input indicators for clinical codes 4, 5, and 8. No output codes are shown as including a missing value. A missing value for an output indicator is identified where all input indicators for the output indicator are identified to have values of “1” or “Yes,” corresponding to a diagnosis for the output indicator, while the output indicator does not show the corresponding value for the diagnosis.

In the single deterministic rules graph shown in FIG. 5B, output indicator has values for all of its input indicators. If any of input indicators 1-3 have a value of “No” or “0,” the value of output indicator is 0. If all of the input indicators 1-3 have a value of “Yes” or “1,” this indicates that the value of output indicator should be 1. If the value of output indicator is missing despite all the input indicators indicating a value of 1 and thus indicating the output indicator, the missing value identification system 112 will identify output indicator A as having a missing value. If the output indicator A has a value of 1, then no missing value is indicated for the data cluster of output indicator A and its associated input indicators.

After all of the missing values have been identified by the missing value identification system 112, at step 408, the risk score generating system 114 determines a risk score for each output indicator in the deterministic rules graph. The risk score is based on a machine learning model 322, that is trained to determine the probability that the value for a specified missing value is 0 or 1. In the example where the data object completion process is being performed to optimize closure of documentation gaps in a healthcare cohort, the trained machine learning model may be similar to, or may include, the RETAIN neural network model where the output is defined as a binary classification of whether or not the value for a node in the model, such as an input indicator for a clinical code, would be fulfilled or not if tested in the appropriate conditions. For example, the RETAIN neural network model may determine the likelihood that a member would test positive in a lab test, or the likelihood that a clinician would prescribe a specific drug during a health visit. The RETAIN model is a neural network machine learning model configured to predict disease progression based on a member’s clinical history and demography, among other factors. The machine learning model 322 used in the risk score generating system 114 is adapted to make similar predictions, but to also predict missing values throughout a patient’s clinical history.

In one example scenario, the trained machine learning model 322 may output a sample set of risk score determinations 324 as indicated in table 1 below.

The trained machine learning model 322 determines a probability $p_i$ for all of the missing input indicators, and a probability $P_i$ for all of the output indicators. $P_i$ is a based on the $p_i$ of all of its input indicators. In the example shown in FIG. 5A, $P_A=f(p_1, p_2, p_3)$, $P_B=f(p_1, p_4, p_7)$, $P_C=f(p_3, p_5, p_6, p_7, p_8)$ and $P_D=f(p_8, p_9, p_{10}, p_{11})$. As shown in FIG. 5B, output indicator A has zero missing input indicators, output indicator B has a missing value for input indicator 4, output indicator C has missing values for input indicators 5 and 8, and output indicator D has a missing value for input indicator 8. The trained machine learning model outputs a value $P_i=1$ for the output indicator of a data cluster, such as data cluster 506A, where the only missing value is the output indicator and the values of all input indicators are "1" or "Yes" or "True." The trained machine learning model outputs a value of $P_i=0$ where there are no missing values in the data cluster, or at least one input indicator has a value of "0" or "No" or "False."

In all other cases, the trained machine learning model outputs a number between 0 and 1 that represents a likelihood that a missing value would be 1 if tested in the appropriate conditions. For example, the trained machine learning model may output a value of $p_4=0.90$ for input indicator 4, indicating a 90% likelihood that the member would satisfy the conditions required of input indicator 4, e.g., a positive lab test. For example purposes, $p_5=0.50$ and $p_8=0.80$.

Advantageously, the trained machine learning model 322 then generates risk score determinations 324 for all of the output indicators in the member-specific deterministic rules graph. As discussed above, $P_A=1$ because data cluster 506A has no missing input indicators. This value indicates that no further testing or clinical visits are required for a diagnosis of output indicator A, only that the medical record for the member should be completed to indicate a positive diagnosis for the disease associated with output indicator A. If the diagnosis for the disease associated with output indicator A was already present, e.g., output indicator A had no missing value, the output $P_A$ would equal 0, indicating that no further documentation or testing is necessary.

In situations where there are missing values for the input indicators, the risk scores for the output indicators are advantageously determined by multiplying together the risk scores for all of the associated input indicators in its data cluster, with a value of 1 given to all input indicators with a known value of 1, and a value of 0 given to all input indicators with a known value of 0.

Illustratively, $P_B=0.90$, because $P_B=f(p_1, p_4, p_7)$, where the value of $p_4$ is 0.90, and because $p_4$ was the only missing value in the data cluster 506B. $P_C=f(p_3, p_5, p_6, p_7, p_8)$. The values for input indicators 3, 6, and 7 are known and for purposes of illustration are assumed to be "1." As discussed above, $p_5=0.50$ and $p_8=0.80$. As such $P_C=(1*0.50*1*1*0.80)=0.40$. Similarly, $P_D=f(p_8, p_9, p_{10}, p_{11})=(0.80*1*1*1)=0.80$.

Advantageously, the risk score generating system can input the risk score determinations 324 into an ordering process 326 to produce an ordered list 328 of risk scores. In some examples, the ordered list 328 is a list of output indicators for a single member ordered from highest risk score to lowest risk score. This ordered list 328 aids medical professionals and practitioners in prioritizing care for the member, by highlighting the diseases for which a member is most at risk of that may have failed to be captured in their medical records. This list 328, in some examples, can be used to determine their next care and prescriptions.

TABLE 1

| Output Indicator | $P_i$ | Rank |
|---|---|---|
| A | 1 | 1 |
| B | 0.90 | 2 |
| D | 0.80 | 3 |
| C | 0.40 | 4 |

In some examples, the method 400 is be completed after step 408. However, in other examples, the method 400 is extended to an entire cohort of members. At step 410, an amalgamated risk score is determined for each member in a cohort by summing the risk score for each output indicator. For example, the member in FIGS. 5A and 5B has an amalgamated risk score of (1+0.90+0.80+0.40)=3.1. The amalgamated risk score for members of a cohort, in some examples, can be used as a proxy value for the priority that should be given to coordinating medical care for the member. The members with the highest amalgamated risk scores represent members with the highest number of potential undiagnosed conditions that could be detected and captured with additional documentation. Because the diagnosis and early treatment of a condition an mitigate the progression of disease, as well as preventing hospitalization and adverse health effects, this provides the advantage of a prioritization index for healthcare providers for allocation of resources with which to diagnose and detect health conditions. Table 2 provides a sample prioritization index that is output by the ordering process 326 of the risk score generating system.

TABLE 2

| Member ID | $P_A$ | $P_B$ | . . . | $P_N$ | $\sum_{i=A}^{i=N} P_i$ | Rank |
|---|---|---|---|---|---|---|
| 4223H | 0.79 | 0 | . . . | 0.97 | 23.78 | 1 |
| 3515J | 1 | 0.04 | . . . | 0.56 | 22.85 | 2 |
| 3712Y | 0.95 | 0.23 | . . . | 0.33 | 22.72 | 3 |
| . . . | . . . | . . . | . . . | . . . | . . . | . . . |

In general, any process or operation discussed in this disclosure that is understood to be computer-implementable can be performed by one or more processors of a computer system as described herein. A process or process step performed by one or more processors is also referred to as an operation. The one or more processors are configured to perform such processes by having access to instructions (e.g., software or computer-readable code) that, when executed by the one or more processors, cause the one or more processors to perform the processes. The instructions are stored in a memory of the computer system. A processor can be a central processing unit (CPU), a graphics processing unit (GPU), or any suitable types of processing unit.

A computer system, such as a system or device implementing a process or operation in the examples above, includes one or more computing devices. One or more processors of a computer system can be included in a single computing device or distributed among a plurality of computing devices. One or more processors of a computer system can be connected to a data storage device. A memory of the computer system includes the respective memory of each computing device of the plurality of computing devices.

Figure 6:
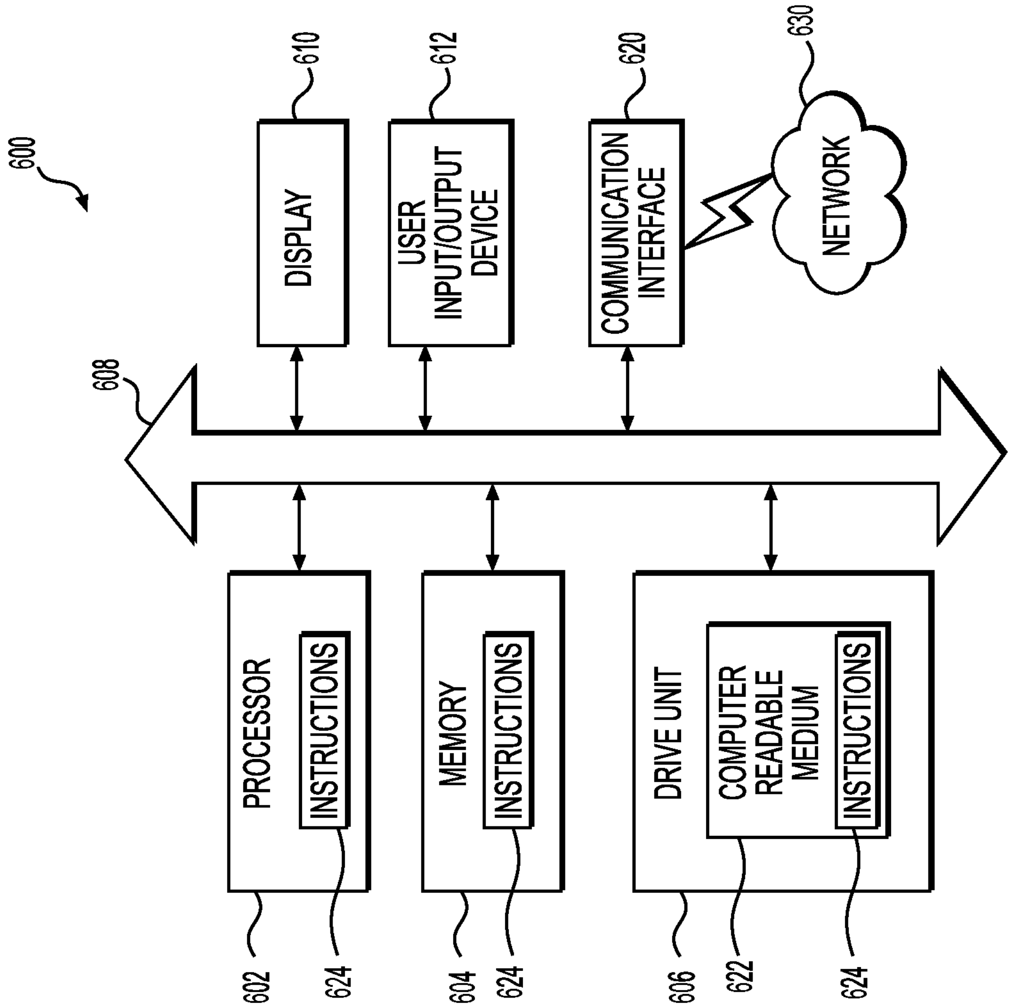
FIG. 6 shows an implementation of a computer system that executes techniques presented herein, according to some embodiments of the disclosure.

FIG. 6 shows an implementation of a computer system 600 that executes techniques presented herein, according to some embodiments of the disclosure. The computer system 600 can include a set of instructions that can be executed to cause the computer system 600 to perform any one or more of the methods or computer-based functions disclosed herein. The computer system 600 operates as a standalone device or is connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" refers to any device or portion of a device that processes electronic data, e.g., from registers and/or memory to transform that electronic data into other electronic data that, e.g., is stored in registers and/or memory. A "computer," a "computing machine," a "computing platform," a "computing device," or a "server" includes one or more processors.

In a networked deployment, the computer system 600 operates in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 can be implemented using electronic devices that provide voice, video, or data communication. Further, while the computer system 600 is illustrated as a single system, the term "system" shall also be taken to include any collection of systems or sub-systems that individually or jointly execute a set, or multiple sets, of instructions to perform one or more computer functions.

As illustrated in FIG. 6, the computer system 600 includes a processor 602, e.g., a central processing unit (CPU), a graphics processing unit (GPU), or both. The processor 602 can be a component in a variety of systems. For example, the processor 602 is part of a standard personal computer or a workstation. The processor 602 is one or more processors, digital signal processors, application specific integrated circuits, field programmable gate arrays, servers, networks, digital circuits, analog circuits, combinations thereof, or other now known or later developed devices for analyzing and processing data. The processor 602 implements a software program, such as code generated manually (e.g., programmed).

The computer system 600 includes a memory 604 that can communicate via a bus 608. The memory 604 is a main memory, a static memory, or a dynamic memory. The memory 604 includes, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media, and the like. In one implementation, the memory 604 includes a cache or random-access memory for the processor 602. In alternative implementations, the memory 604 is separate from the processor 602, such as a cache memory of a processor, the system memory, or other memory. The memory 604 can be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein are performed by the processor 602 executing the instructions stored in the memory 604. The functions, acts or tasks are independent of the particular type of instructions set, storage media, processor or processing strategy and are performed by software, hardware, integrated circuits, firm-ware, micro-code and the like, operating alone or in combination. Likewise, processing strategies can include multiprocessing, multitasking, parallel processing, and the like.

As shown, the computer system 600 further included a display 610, such as a liquid crystal display (LCD), an organic light emitting diode (OLED), a flat panel display, a solid-state display, a cathode ray tube (CRT), a projector, a printer or other now known or later developed display device for outputting determined information. The display 610 acts as an interface for the user to see the functioning of the processor 602, or specifically as an interface with the software stored in the memory 604 or in a drive unit 606.

Additionally or alternatively, the computer system 600 includes an input/output device 612 configured to allow a user to interact with any of the components of the computer system 600. The input/output device 612 is a number pad, a keyboard, or a cursor control device, such as a mouse, or a joystick, touch screen display, remote control, or any other device operative to interact with the computer system 600.

The computer system 600 also or alternatively includes the drive unit 606 implemented as a disk or optical drive. The drive unit 606 includes a computer-readable medium 622 in which one or more sets of instructions 624, e.g., software, can be embedded. Further, the sets of instructions 624 embody one or more of the methods or logic as described herein. The instructions 624 reside completely or partially within the memory 604 and/or within the processor 602 during execution by the computer system 600. The memory 604 and the processor 602 can also include computer-readable media as discussed above.

In some systems, the computer-readable medium 622 includes the sets of instructions 624 or receives and executes the sets of instructions 624 responsive to a propagated signal so that a device connected to a network 630 can communicate voice, video, audio, images, or any other data over the network 630. Further, the sets of instructions 624 are transmitted or received over the network 630 via a communication port or interface 620, and/or using the bus 608. The communication port or interface 620 is a part of the processor 602 or is a separate component. The communication port or interface 620 is created in software or is a physical connection in hardware. The communication port or interface 620 are configured to connect with the network 630, external media, the display 610, or any other components in the computer system 600, or combinations thereof. The connection with the network 630 is a physical connection, such as a wired Ethernet connection or is established wirelessly as discussed below. Likewise, the additional connections with other components of the computer system 600 are physical connections or are established wirelessly. The network 630 is alternatively directly connected to the bus 608.

While the computer-readable medium 622 is shown to be a single medium, the term "computer-readable medium" includes a single medium or multiple media, such as a centralized or distributed database, and/or associated caches and servers that store one or more sets of instructions. The term "computer-readable medium" also includes any medium that is capable of storing, encoding, or carrying a set of instructions for execution by a processor or that cause a computer system to perform any one or more of the methods or operations disclosed herein. In some examples, the computer-readable medium 622 is non-transitory, and is tangible.

The computer-readable medium 622 can include a solid-state memory such as a memory card or other package that houses one or more non-volatile read-only memories. The computer-readable medium 622 can be a random-access memory or other volatile re-writable memory. Additionally or alternatively, the computer-readable medium 622 can include a magneto-optical or optical medium, such as a disk or tapes or other storage device to capture carrier wave signals such as a signal communicated over a transmission medium. A digital file attachment to an e-mail or other self-contained information archive or set of archives are considered a distribution medium that is a tangible storage medium. Accordingly, the disclosure is considered to include any one or more of a computer-readable medium or a distribution medium and other equivalents and successor media, in which data or instructions are storable.

In an alternative implementation, dedicated hardware implementations, such as application specific integrated circuits, programmable logic arrays and other hardware devices, can be constructed to implement one or more of the methods described herein. Applications that include the apparatus and systems of various implementations can broadly include a variety of electronic and computer systems. One or more implementations described herein implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 is connected to the network 630. The network 630 defines one or more networks including wired or wireless networks, such as the network 104 described in FIG. 1. The wireless network can be a cellular telephone network, an 602.11, 602.18, 602.20, or WiMAX network. Further, such networks include a public network, such as the Internet, a private network, such as an intranet, or combinations thereof, and utilize a variety of networking protocols now available or later developed including, but not limited to TCP/IP based networking protocols. The network 630 can include wide area networks (WAN), such as the Internet, local area networks (LAN), campus area networks, metropolitan area networks, a direct connection such as through a Universal Serial Bus (USB) port, or any other networks that allow for data communication. The network 630 is configured to couple one computing device to another computing device to enable communication of data between the devices. The network 630 generally is enabled to employ any form of machine-readable media for communicating information from one device to another. The network 630 includes communication methods by which information may travel between computing devices. The network 630 can be divided into sub-networks. The sub-networks allow access to all of the other components connected thereto or the sub-networks restrict access between the components. The network 630 can be regarded as a public or private network connection and can include, for example, a virtual private network or an encryption or other security mechanism employed over the public Internet, or the like.

In accordance with various implementations of the present disclosure, the methods described herein are implemented by software programs executable by a computer system. Further, in one example, non-limited implementation, implementations can include distributed processing, component/object distributed processing, and parallel processing. Alternatively, virtual computer system processing can be constructed to implement one or more of the methods or functionalities as described herein.

Although the present specification describes components and functions that are implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (e.g., computer) system executing instructions (computer-readable code) stored in storage. It will also be understood that the disclosure is not limited to any particular implementation or programming technique and that the disclosure is implementable using any appropriate techniques for implementing the functionality described herein. The disclosure is not limited to any particular programming language or operating system.

It should be appreciated that in the above description of example embodiments, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claims require more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment.

Furthermore, while some embodiments described herein include some but not other features included in other embodiments, combinations of features of different embodiments are meant to be within the scope of the disclosure, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the methods and techniques described herein.

In the description provided herein, numerous specific details are set forth. However, it is understood that embodiments of the methods and techniques described can be practiced without these specific details. In other instances, well-known methods, structures, and techniques have not been shown in detail in order not to obscure an understanding of this description.

Thus, while there has been described what are believed to be the preferred embodiments, those skilled in the art will recognize that other and further modifications can be made thereto without departing from the spirit of the disclosure, and it is intended to claim all such changes and modifications as falling within the scope of the disclosure. For example, any formulas given above are merely representative of procedures that can be used. Functionality can be added or deleted from the block diagrams and operations are interchangeable among functional blocks. Steps can be added or deleted to methods described within the scope of the disclosure.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

The present disclosure furthermore relates to the following aspects.

Example 1. A computer-implemented method comprising: receiving, by one or more processors, one or more data objects associated with an entity, each of the one or more data objects including one or more input indicators and one or more output indicators based on the one or more input indicators; determining, by the one or more processors and using a deterministic rules graph that maps each of the one or more input indicators to a corresponding one of the one or more output indicators, at least one of a first missing value for an input indicator of the one or more input indicators or a second missing value for an output indicator of the one or more output indicators; generating, by the one or more processors and using a trained machine learning model, a risk score associated with each of the one or more output indicators based on the at least one of the first missing value or the second missing value; comparing, by the one or more processors, the risk score associated with each of the one or more output indicators to a predetermined threshold value; and causing, by the one or more processors, the at least one of the first missing value or the second missing value to be displayed on a user device as an alert generated based on the comparing.

Example 2. The computer-implemented method of example 1, wherein determining the missing values that exist in connection with the one or more output indicators further comprises: identifying one or more data clusters within the deterministic rules graph, each data cluster comprising an output indicator and one or more input indicators that the output indicator is based on, and determining that the one or more data clusters include the one or more missing values.

Example 3. The computer-implemented method of any of the preceding examples, wherein generating the risk score comprises: providing the missing values and the one or more input indicators to the trained machine learning model to generate the risk score for each of the one or more output indicators.

Example 4. The computer-implemented method of any of the preceding examples, further comprising: generating, by the one or more processors, a list of input indicators with missing values associated with the output indicators with missing values, the input indicators within the list being ordered based on the risk scores associated with the corresponding output indicators.

Example 5. The computer-implemented method of any of the preceding examples, wherein the risk score associated with output indicators with a known value is zero.

Example 6. The computer-implemented method of any of the preceding examples, further comprising: calculating, by the one or more processors, a cumulative risk score by summing the risk score(s) associated with the one or more output indicators.

Example 7. The computer-implemented method of any of the preceding examples, wherein the trained machine learning model is trained using a training data set comprising a plurality of input indicators and a plurality of output indicators, to identify one or more associations between the input indicators and the output indicators.

Example 8. A system comprising memory and one or more processors communicatively coupled to the memory, the one or more processors configured to: receive one or more data objects associated with an entity, each of the one or more data objects including one or more input indicators and one or more output indicators based on the one or more input indicators; determine, using a deterministic rules graph that maps each of the one or more input indicators to a corresponding one of the one or more output indicators, at least one of a first missing value for an input indicator of the one or more input indicators or a second missing value for an output indicator of the one or more output indicators; generate, using a trained machine learning model, a risk score associated with each of the one or more output indicators based on the at least one of the first missing value or the second missing value; compare the risk score associated with each of the one or more output indicators to a predetermined threshold value; and cause the at least one of the first missing value or the second missing value to be displayed on a user device as an alert generated based on the comparing.

Example 9. The system of example 8, wherein determining at least one of a first missing value for an input indicator of the one or more input indicators or a second missing value for an output indicator of the one or more output indicators further comprises: identifying one or more data clusters within the deterministic rules graph, each data cluster comprising one output indicator and one or more input indicators that the output indicator is based on, and determining that the one or more data clusters include at least one of the first missing value or at least one of the second missing value.

Example 10. The system of any of examples 8-9, wherein generating the risk score comprises: providing member data and the one or more input indicators to the trained machine learning model to generate the risk score for each of the one or more output indicators.

Example 11. The system of any of examples 8-10, the one or more processors further configured to: generate a list of input indicators with missing values associated with the output indicators with missing values, the input indicators within the list being ordered based on the risk scores associated with the corresponding output indicators.

Example 12. The system of any of examples 8-11, wherein the risk score associated with output indicators with a known value is zero.

Example 13. The system of any of examples 8-12, the one or more processors further configured to: calculate a cumulative risk score by summing the risk score(s) associated with the one or more output indicators.

Example 14. The system of any of examples 8-13, wherein the trained machine learning model is trained using a training data set comprising a plurality of input indicators and a plurality of output indicators, to identify one or more associations between the input indicators and the output indicators.

Example 15. One or more non-transitory computer-readable storage media including instructions that, when executed by one or more processors, cause the one or more processors to: receive one or more data objects associated with an entity, each of the one or more data objects including one or more input indicators and one or more output indicators based on the one or more input indicators; determine, using a deterministic rules graph that maps each of the one or more input indicators to a corresponding one of the one or more output indicators, at least one of a first missing value for an input indicator of the one or more input indicators or a second missing value for an output indicator of the one or more output indicators; generate, using a trained machine learning model, a risk score associated with each of the one or more output indicators based on the at least one of the first missing value or the second missing value; compare the risk score associated with each of the one or more output indicators to a predetermined threshold value; and cause the at least one of the first missing value or the second missing value to be displayed on a user device as an alert generated based on the comparing.

Example 16. The one or more non-transitory computer-readable storage media of example 15, wherein a value for an output indicator is one of zero or one, and the risk score associated with each of the one or more output indicators is between zero and one, the risk score indicating a likelihood that the missing value for an output indicator is one.

Example 17. The one or more non-transitory computer-readable storage media of any of examples 15-16, wherein the instructions further cause the one or more processors to: generate a list of input indicators with missing values associated with the output indicators with missing values, the list descending from input indicators associated with output indicators with higher risk scores to input indicators associated with output indicators with lower risk scores.

Example 18. The one or more non-transitory computer-readable storage media of any of examples 15-17, wherein the risk score associated with output indicators with a known value is zero.

Example 19. The one or more non-transitory computer-readable storage media of any of examples 15-18, wherein the instructions further cause the one or more processors to: calculate a cumulative risk score by summing the risk score(s) associated with the one or more output indicators.

Example 20. The one or more non-transitory computer-readable storage media of any of examples 15-19, wherein the trained machine learning model is trained to identify a correlation between the one or more input indicators and the one or more output indicators.

What is claimed is:

1. A computer-implemented method comprising:

receiving, by one or more processors, one or more data objects associated with an entity, each of the one or more data objects including one or more input indicators and one or more output indicators based on the one or more input indicators;

determining, by the one or more processors and using a deterministic rules graph that maps each of the one or more input indicators to a corresponding one of the one or more output indicators, an expected presence of each of the one or more output indicators based on the one or more input indicators, and at least one of a first missing value for an input indicator of the one or more input indicators or a second missing value for an output indicator of the one or more output indicators based on the expected presence of the corresponding one of the one or more output indicators;

generating, by the one or more processors and using a trained machine learning model, a risk score associated with each of the one or more output indicators based on the at least one of the first missing value or the second missing value;

comparing, by the one or more processors, the risk score associated with each of the one or more output indicators to a predetermined threshold value; and causing, by the one or more processors, the at least one of the first missing value or the second missing value to be displayed on a user device as an alert generated based on the comparing.

2. The computer-implemented method of claim 1, wherein determining the at least one of the first missing value or the second missing value based on the expected presence of the corresponding one of the one or more output indicators further comprises:

identifying one or more data clusters within the deterministic rules graph, each data cluster of the one or more data clusters comprising the output indicator and ones of the one or more input indicators that the output indicator is based on, and determining that the one or more data clusters include the at least one of the first missing value or the second missing value.

3. The computer-implemented method of claim 1, wherein generating the risk score comprises:

providing the at least one of the first missing value or the second missing value and the one or more input indicators to the trained machine learning model to generate the risk score for each of the one or more output indicators.

4. The computer-implemented method of claim 1, further comprising:

generating, by the one or more processors, a list of the one or more input indicators with missing values associated with the one or more output indicators with the missing values, the ones of the one or more input indicators within the list being ordered based on the risk score associated with each of the one or more output indicators.

5. The computer-implemented method of claim 1, wherein the risk score associated with each of the one or more output indicators with a known value is zero.

6. The computer-implemented method of claim 1, further comprising:
calculating, by the one or more processors, a cumulative risk score by summing the risk score associated with each of the one or more output indicators.

7. The computer-implemented method of claim 1, wherein the trained machine learning model is trained using a training data set comprising a plurality of input indicators and a plurality of output indicators, to identify one or more associations between the plurality of input indicators and the plurality of output indicators.

8. A system comprising:
one or more processors; and
one or more non-transitory computer-readable storage media storing instructions that, when executed by the one or more processors, cause the one or more processors to perform operations comprising:
receiving one or more data objects associated with an entity, each of the one or more data objects including one or more input indicators and one or more output indicators based on the one or more input indicators;
determining, using a deterministic rules graph that maps each of the one or more input indicators to a corresponding one of the one or more output indicators, an expected presence of each of the one or more output indicators based on the one or more input indicators, and at least one of a first missing value for an input indicator of the one or more input indicators or a second missing value for an output indicator of the one or more output indicators based on the expected presence of the corresponding one of the one or more output indicators;
generating, using a trained machine learning model, a risk score associated with each of the one or more output indicators based on the at least one of the first missing value or the second missing value;
comparing the risk score associated with each of the one or more output indicators to a predetermined threshold value; and
causing the at least one of the first missing value or the second missing value to be displayed on a user device as an alert generated based on the comparing.

9. The system of claim 8, wherein determining the at least one of the first missing value or the second missing value based on the expected presence of the corresponding one of the one or more output indicators further comprises:
identifying one or more data clusters within the deterministic rules graph, each data cluster of the one or more data clusters comprising the one output indicator and one of the one or more input indicators that the output indicator is based on, and
determining that the one or more data clusters include the at least one of the first missing value or the second missing value.

10. The system of claim 8, wherein generating the risk score comprises:
providing member data and the one or more input indicators to the trained machine learning model to generate the risk score for each of the one or more output indicators.

11. The system of claim 8, the operations further comprising:
generating a list of the one or more input indicators with missing values associated with the one or more output indicators with the missing values, the ones of the one or more input indicators within the list being ordered based on the risk score associated with each of the one or more output indicators.

12. The system of claim 8, wherein the risk score associated with each of the one or more output indicators with a known value is zero.

13. The system of claim 8, the operations further comprising:
calculating a cumulative risk score by summing the risk score associated with each of the one or more output indicators.

14. The system of claim 8, wherein the trained machine learning model is trained using a training data set comprising a plurality of input indicators and a plurality of output indicators, to identify one or more associations between the plurality of input indicators and the plurality of output indicators.

15. One or more non-transitory computer-readable storage media including instructions that, when executed by one or more processors, cause the one or more processors to:
receive one or more data objects associated with an entity, each of the one or more data objects including one or more input indicators and one or more output indicators based on the one or more input indicators;
determine, using a deterministic rules graph that maps each of the one or more input indicators to a corresponding one of the one or more output indicators, an expected presence of each of the one or more output indicators based on the one or more input indicators, and at least one of a first missing value for an input indicator of the one or more input indicators or a second missing value for an output indicator of the one or more output indicators based on the expected presence of the corresponding one of the one or more output indicators;
generate, using a trained machine learning model, a risk score associated with each of the one or more output indicators based on the at least one of the first missing value or the second missing value;
compare the risk score associated with each of the one or more output indicators to a predetermined threshold value; and
cause the at least one of the first missing value or the second missing value to be displayed on a user device as an alert generated based on the comparing.

16. The one or more non-transitory computer-readable storage media of claim 15, wherein
a value for an output indicator is one of zero or one, and
the risk score associated with each of the one or more output indicators is between zero and one, the risk score indicating a likelihood that the missing value for an output indicator is one.

17. The one or more non-transitory computer-readable storage media of claim 15, wherein the instructions further cause the one or more processors to:
generate a list of the one or more input indicators with missing values associated with the one or more output indicators with missing values, the list descending from input indicators associated with output indicators with higher risk scores to input indicators associated with output indicators with lower risk scores.

18. The one or more non-transitory computer-readable storage media of claim 15, wherein the risk score associated with each of the one or more output indicators with a known value is zero.

19. The one or more non-transitory computer-readable storage media of claim 15, wherein the instructions further cause the one or more processors to:

calculate a cumulative risk score by summing the risk score associated with each of the one or more output indicators.

20. The one or more non-transitory computer-readable storage media of claim 15, wherein the trained machine learning model is trained to identify a correlation between the one or more input indicators and the one or more output indicators.

* * * * *